United States Patent
Takihara et al.

(10) Patent No.: US 9,290,666 B2
(45) Date of Patent: Mar. 22, 2016

(54) LAMINATE AND METHOD FOR MANUFACTURING THE SAME

(75) Inventors: Tsuyoshi Takihara, Hiroshima (JP); Seiichiro Mori, Hiroshima (JP); Eiko Okamoto, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 13/638,058

(22) PCT Filed: Mar. 30, 2011

(86) PCT No.: PCT/JP2011/057951
§ 371 (c)(1),
(2), (4) Date: Nov. 20, 2012

(87) PCT Pub. No.: WO2011/125699
PCT Pub. Date: Oct. 13, 2011

(65) Prior Publication Data
US 2013/0129977 A1    May 23, 2013

(30) Foreign Application Priority Data

Mar. 31, 2010 (JP) .................. 2010-081617
Jul. 15, 2010 (JP) .................. 2010-160610
Mar. 10, 2011 (JP) .................. 2011-052937

(51) Int. Cl.
| | |
|---|---|
| *B32B 7/02* | (2006.01) |
| *C09D 5/00* | (2006.01) |
| *G02B 1/118* | (2015.01) |
| *B05D 5/00* | (2006.01) |
| *C08J 7/04* | (2006.01) |

(52) U.S. Cl.
CPC ........ *C09D 5/006* (2013.01); *B05D 5/00* (2013.01); *C08J 7/042* (2013.01); *G02B 1/118* (2013.01); *C08J 2367/02* (2013.01); *C08J 2475/16* (2013.01); *Y10T 428/24355* (2015.01); *Y10T 428/24975* (2015.01)

(58) Field of Classification Search
CPC .......... B32B 7/02; B32B 27/30; G02B 1/118; B05D 5/00; C09D 5/006; Y10T 428/24975
USPC .................. 428/141, 212, 216, 220
See application file for complete search history.

(56) References Cited

FOREIGN PATENT DOCUMENTS

| | | |
|---|---|---|
| JP | 9-61601 | 3/1997 |
| JP | 2000-71290 | 3/2000 |
| JP | 2002-107501 | 4/2002 |
| JP | 2002-256053 | 9/2002 |
| JP | 2005-70744 | 3/2005 |
| JP | 2005-181548 | 7/2005 |
| JP | 2006-62240 | 3/2006 |
| JP | 2009-31764 | 2/2009 |
| JP | 2009-145644 | 7/2009 |
| JP | 2009-265640 | 11/2009 |
| WO | 2008/035660 | 3/2008 |

OTHER PUBLICATIONS

Makino et al (JP 2009-265640 machine translation), Nov. 12, 2009.*
Santo (JP 2009-186567), Aug. 11, 2009.*
International Search Report for PCT/JP2011/057951.

\* cited by examiner

*Primary Examiner* — Aaron Austin
*Assistant Examiner* — Lawrence Ferguson
(74) *Attorney, Agent, or Firm* — Morgan, Lewis & Bockius LLP (57) ABSTRACT

A laminate includes a substrate, and a surface layer laminated on the substrate with an intermediate layer sandwiched therebetween. The intermediate layer has a thickness of 8 to 40 μm. The surface layer has a thickness 0.4 to 1.5 times that of the intermediate layer. The laminate satisfies the following (A) and/or (B): (A) tan δ (loss tangent) of the intermediate layer as measured under a condition of a vibration frequency of 1 Hz at 20° C. is 0.2 or greater; and (B) A ratio (MG/SG) of a storage modulus (MG) of the intermediate layer to a storage modulus (SG) of the surface layer as measured under a condition of a vibration frequency of 1 Hz at 20° C. is 0.003 or greater and 0.14 or less.

13 Claims, 2 Drawing Sheets

LAMINATE AND METHOD FOR MANUFACTURING THE SAME

TECHNICAL FIELD

The present invention relates to a laminate and a method for manufacturing the same. More particularly, the present invention relates to a laminate having excellent scratch resistance even when the laminate has a nano uneven structure on its surface, for example.

BACKGROUND ART

It is known that a nano uneven structure body having a nano uneven structure on its surface exhibits antireflective performance according to a change in a continuous refractive index. The nano uneven structure body can also exhibit super-water-repellent performance according to a lotus effect. However, the surface of the nano uneven structure has a nanoscale projecting part which is apt to be inclined, and has lower scratch resistance and durability than a smooth surface made of the same resin.

The following methods are proposed as a method for forming the nano uneven structure: for example, a method for performing injection molding and press molding using a stamper having a reversal structure of a nano uneven structure; a method for interposing an active energy beam-curable resin composition (hereinafter; referred to as a "resin composition") between a stamper and a transparent substrate, irradiating the resin composition with an active energy beam to cure the resin composition, transferring the uneven shape of the stamper, and thereafter peeling off the stamper; and a method for transferring the uneven shape of a stamper to a resin composition, peeling off the stamper, and thereafter irradiating the resin composition with an active energy beam to cure the resin composition. Of these, the method for irradiating a resin composition with an active energy beam to cure the resin composition and transferring a nano uneven structure is suitable in light of transferability of the nano uneven structure and a degree of freedom of a surface composition. This method is particularly suitable when a belt-like or roll-like stamper capable of being continuously produced is used, and has excellent productivity. However, a resin having high cross-link density and a high elastic modulus is used in order to suppress the inclination of the projecting part during mold releasing of the stamper and by heating.

Intervals between the adjacent projecting parts or recessed parts need to be a size equal to or less than a wavelength of visible light in order for the nano uneven structure to exhibit good antireflective performance. The nano uneven structure body has lower scratch resistance than a molded product such as a hard coat produced using the same resin composition and having a smooth surface, and has a problem with durability in use. When the resin composition used for producing the nano uneven structure body is insufficiently robust, a phenomenon in which projections are disposed close to each other is apt to be generated by mold releasing from a mold and heating.

Heretofore, there are proposed a nano uneven structure body for which a nano uneven structure is formed using a method comprising irradiating a resin composition with an active energy beam to cure the resin composition and transferring the nano uneven structure, and a resin composition for forming a nano uneven structure. However, both involve cured products having high cross-link density and a high elastic modulus.

For example, Patent Literature 1 describes production of a nano uneven structure having a size equal to or less than the wavelength of visible light using closest packed silica sol as a mold. A multifunctional monomer having an extremely high double bond number per molecular weight such as trimethylolpropane triacrylate is used as a resin composition for forming the nano uneven structure.

Patent Literature 2 describes that a hard coat layer having fine unevenness is desirably a resin having hardness of "H" or greater in a pencil hardness test according to JIS K5600-5-4 (Paragraph 0022). Example thereof uses a multifunctional monomer having an extremely large number of double bonds per molecular weight such as dipentaerythritol hexaacrylate, dipentaerythritol pentaacrylate, and pentaerythritol tetraacrylate.

There are also reported an intermediate layer (Patent Literatures 2 and 3) that improves the adhesion and adhesiveness between a substrate film and a surface layer of a nano uneven structure, a laminate provided with a refractive index adjusting layer (Patent Literature 4) of a lower layer of a surface of a nano uneven structure in order to improve an antireflective effect, and an antireflective film (Patent Literature 5) including an intermediate layer having a function (self-restoring function) for restoring recessed flaws and a hard coat layer provided on the intermediate layer and having a different refractive index.

However, the nano uneven structure bodies described in Patent Literatures 1 to 4 do not necessarily satisfy scratch resistance. Even when the cured resin has hardness of "H" or greater in the pencil hardness test, the fine projection may be broken or bent to impair antireflective performance, particularly in the case of the nano uneven structure body, and the application thereof is limited. Even when the intermediate layer is provided, the intermediate layer is intended to improve adhesiveness and antireflective performance, and the scratch resistance thereof depends on the physical properties of the resin constituting the nano uneven structure. Although the antireflective film described in Patent Literature 5 has the intermediate layer having a self-restoring function to dent caused by pressing, the antireflective film may exhibit insufficient scratch resistance. For example, the thickness of the hard coat layer, the top layer, is as thin as 0.1 μm. When this is pushed in, the hard coat layer is broken, and is apt to be damaged in the pencil hardness test.

CITATION LIST

Patent Literature

Patent Literature 1: JP2000-71290A
Patent Literature 2: JP2002-107501A
Patent Literature 3: JP3627304B
Patent Literature 4: JP2009-31764A
Patent Literature 5: JP3676260B

SUMMARY OF INVENTION

Technical Problem

It is an object of the present invention to provide a laminate which exhibits an antireflection function provided by a nano uneven structure and the like, for example, and exhibits high scratch resistance which cannot be achieved heretofore, particularly "3H" or greater in a pencil hardness test according to JIS K5500-5-4.

It is another object of the present invention to provide a laminate which has high restoration with respect to strain caused by pressing, excellent scratch resistance, particularly high scratch resistance when the strain caused by pressing is repeated, excellent durability, a high antireflection function, and a good appearance.

Solution to Problem

The present inventors have diligently studied in order to attain the above-mentioned objects. As a result, the inventors have found out that a laminate having a specific constitution exhibits an excellent effect. Thus, the present invention has been completed.

The present invention provides a laminate including: a substrate; and a surface layer laminated on the substrate with an intermediate layer sandwiched therebetween, wherein the intermediate layer has a thickness of 8 to 40 μm; the surface layer has a thickness 0.4 to 1.5 times that of the intermediate layer; and the laminate satisfies the following (A) and/or (B):
(A) tan δ (loss tangent) of the intermediate layer as measured under a condition of a vibration frequency of 1 Hz at 20° C. is 0.2 or greater; and
(B) a ratio (MG/SG) of a storage modulus (MG) of the intermediate layer to a storage modulus (SG) of the surface layer as measured under a condition of a vibration frequency of 1 Hz at 20° C. is 0.003 or greater and 0.14 or less.

The present invention provides a method for manufacturing the above-mentioned laminate having a nano uneven structure. The method includes an intermediate layer forming step of applying an intermediate layer raw material on a substrate and irradiating the intermediate layer raw material with an active energy beam to completely cure a coating of the intermediate layer raw material or cure the coating up to a state not reaching complete curing; and a surface layer forming step of interposing an active energy beam-curable resin composition between a stamper having a reversal structure of the nano uneven structure and the intermediate layer formed on the substrate, irradiating the active energy beam-curable resin composition with an active energy beam to cure the active energy beam-curable resin composition, and peeling off the stamper from a layer comprising a cured product of the active energy beam-curable resin composition to form a surface layer having the nano uneven structure comprising the cured product.

Advantageous Effects of Invention

In the present invention, the intermediate layer has specific physical properties and a specific thickness, and the ratio of the thickness of the surface layer to that of the intermediate layer is in a specific range. Thereby, indentation flaws and recessed flaws tend to be well restored, which dramatically improves scratch resistance with respect to repeat scratch. The present invention exhibits "3H" or greater in a pencil hardness test according to JIS K5600-5-4.

In the present invention, the ratio of the storage modulus of the surface layer to that of the intermediate layer is in the specific range. Thereby, the laminate has high restoration with respect to strain caused by pressing, excellent scratch resistance, particularly high scratch resistance when the strain caused by pressing is repeated, excellent durability, a high antireflection function, and a good appearance.

DESCRIPTION OF EMBODIMENT

[Laminate]

A laminate of the present invention comprises a substrate, an intermediate layer, and a surface layer. The intermediate layer may include two or more layers. However, the intermediate layer is desirably one layer from the viewpoints of productivity and cost.

[Substrate]

The material of the substrate may be any as long as the substrate can support the surface layer via the intermediate layer. However, as described later, a substrate having light transparency with respect to an active energy beam (hereinafter, referred to as a "transparent substrate") is preferable, in order to irradiate the surface layer with the active energy beam via the substrate to enable the curing of the surface layer, and in order to enable the use of a stamper having a light blocking effect. The transparent substrate is not particularly limited as long as the transparent substrate is a molded product transmitting the above-mentioned active energy beam. Examples of the material for the transparent substrate include synthetic polymers such as a methyl methacrylate (co)polymer, polycarbonate, a styrene (co)polymer, and a methyl methacrylate-styrene copolymer; semi-synthetic polymers such as cellulose diacetate, cellulose triacetate, and cellulose acetate butyrate; polyesters such as polyethylene terephthalate and polylactic acid; polyimide; polyimide; polyethersulfone; polysulfone; polyethylene; polypropylene; polymethylpentene; polyvinyl chloride; polyvinyl acetal; polyether ketone; polyurethane, a polymer composite thereof (for example, a composite of polymethylmethacrylate and polylactic acid, and a composite of polymethylmethacrylate and polyvinyl chloride); and glass.

The shape of the substrate and the manufacturing method thereof are not particularly limited. For example, an injection molded product, an extrusion molded product, and a cast molded product can be used. The substrate may have a sheet shape, a film shape, and other three-dimensional shape. Particularly, in view of facilitating molding of an upper layer, the substrate preferably has a film shape having flexibility. Furthermore, the surface of the substrate may be subjected to coating and corona processing in order to improve properties such as adhesion, antistatic property, scratch resistance, and weather resistance.

When the substrate is a film, the thickness thereof is preferably 500 μm or less. A molded product having a nano uneven surface can be easily manufactured by using the film substrate for the surface of the molded product and the like.

[Intermediate Layer]

The intermediate layer is preferably formed of a resin having specific physical properties as described later. For example, the intermediate layer can be formed by an intermediate layer raw material containing a polymerization reactive monomer component and an active energy beam polymerization initiator and if needed, a solvent and other components. The intermediate layer can be also formed by applying a polymer compound dissolved in a solvent, and drying and removing the solvent.

The thickness of the intermediate layer is preferably 8 to 40 μm, more preferably 10 to 30 μm, particularly preferably 10 to 25 μm, and most preferably 15 to 20 μm. The lower limit values of these ranges have a meaning in that energies such as a pushing stress to the laminate and friction on the laminate are dispersed to reduce flaws on the surface layer of the laminate. The upper limit values thereof have a meaning in that a compressive deformation amount during pushing is suppressed to prevent the problematic breaking of the surface layer caused by inability of the surface layer to follow the deformation amount. The thickness accuracy of the intermediate layer is preferably within ±2 μm, and more preferably within ±1 μm.

Tan δ (loss tangent) of the intermediate layer is preferably 0.2 or greater at 20° C. and 1 Hz, and more preferably 0.4 or greater and 2 or less. Thereby, energies such as friction on the laminate can be appropriately dispersed, and the flaws on the surface layer of the laminate can be reduced. The tan δ is a value obtained by dividing a storage modulus by a loss modulus. The tan δ is evaluated and calculated by general dynamic viscoelasticity measurement. In the present invention, the intermediate layer raw material is photocured, or a polymer dissolved in a solvent is applied and the solvent is dried and removed, to mold a film having a thickness of 500 μm. The film is punched in a 5 mm wide strip to produce a specimen. The specimen is measured under conditions of a tensile mode, a distance between chucks: 2 cm, and a temperature rise speed at −50 to 100° C. at a vibration frequency of 1 Hz: 2° C./min using a dynamic mechanical spectrometer DMS110 manufactured by Seiko Instruments Inc., to obtain the tan δ.

The intermediate layer is preferably formed of a resin which has a compressive breaking stress of 20 MPa or greater and a compressive stress of 1 to 20 MPa in a compression ratio of 20%, and returns to 90% or greater of the original thickness when a stress is released after the resin is compressed. In the present invention, the intermediate layer raw material is photocured, or a polymer dissolved in a solvent is applied and the solvent is dried and removed, to mold a plate having a thickness of 5 mm. The plate is punched in a cylindrical shape having a diameter of 12 mm to produce a specimen. The specimen is measured while the specimen is compressed until a compression ratio is set to 50% at a speed of 0.5 mm/min by a compression testing machine. Subsequently, the stress is released, and it is confirmed whether the specimen returns to 90% of the original thickness.

The compressive breaking stress of the resin constituting the intermediate layer is preferably 20 MPa or greater, more preferably 30 MPa or greater, particularly preferably 40 MPa or greater, and most preferably 50 MPa or greater. These ranges have a meaning in that the intermediate layer is not broken even in a test in which a high load is applied, such as a pencil hardness test, and problematic residual flaws caused by unendurable pushing are suppressed.

A compressive stress in 20% of the compression ratio of the resin constituting the intermediate layer is preferably 1 to 20 MPa, more preferably 1 to 15 MPa, particularly preferably 2 to 15 MPa, and most preferably 2 to 10 MPa. The upper limit values of these ranges have a meaning in that the stress to the laminate tends to be dispersed. The lower limit values have a meaning in that the generation of the breaking of the surface layer caused by inability of the surface layer to follow the compressive deformation amount is prevented by suppressing the compressive deformation amount during pushing. The compression ratio of 20% refers to a state where a specimen having an original thickness of 5 mm is compressed by 1 mm which is 20% of the original thickness, for example.

The resin contained in the intermediate layer preferably is formed of a resin returning to 90% or greater of the original thickness when the stress is released after the resin is compressed. The limit restoring to 90% or greater of the original thickness is preferably 20% or greater of the compression ratio, more preferably 40% or greater of the compression ratio, and particularly preferably 50% or greater of the compression ratio. These ranges have a meaning in that a dent is restored with time to erase the flaws even when the flaws seem to be temporarily generated by pushing. The restoration from the deformation is preferably fast. For example, a time until the stress is released from a state compressed by 50% without breaking the intermediate layer even if the intermediate layer is compressed to 50% (for example, holding for 5 minutes), to be restored to 90% of the original thickness, is preferably within 5 minutes, more preferably within 3 minutes, and particularly preferably within minute. Even if the restoration from the deformation is slow, the restoration can be accelerated by heating and the like.

Next, the suitable polymerization reactive monomer component of the intermediate layer raw material for forming the intermediate layer, the active energy beam polymerization initiator, and other components will be described. Furthermore, a polymer for forming the intermediate layer, a solvent dissolving the polymer, and other components will be described.

<Polymerization Reactive Monomer Component>

The polymerization reactive monomer component is not particularly limited as long as the polymerization reactive monomer component can form the intermediate layer having desired physical properties and can form the intermediate layer of a cured resin under a curing reaction. A monomer is preferable, which can produce the cured resin exhibiting the above-mentioned physical properties. For example, the polymerization reactive monomer component preferably contains a component contributing to adhesion between the transparent substrate or the surface layer and the intermediate layer, a component imparting a restoring force to the intermediate layer, and a component imparting impact absorption capacity to the intermediate layer.

A monomer having a polar site capable of forming a hydrogen bond is preferable as the component contributing to the adhesion between the substrate or the surface layer and the intermediate layer. Examples of the polar site include a urethane bond, a carboxyl group, and a hydroxyl group. Specific examples of the monomer having a carboxyl group include acrylic acid, methacrylic acid, maleic acid, and succinic acid. Specific examples of the monomer having a hydroxyl group include 2-hydroxyethyl (meth)acrylate, 2-hydroxypropyl (meth)acrylate, 4-hydroxybutyl (meth)acrylate, cyclohexanedimethanol mono(meth)acrylate, and N-methylol (meth)acrylamide. Another examples thereof include lactone-modified (meth)acrylate ["PLACCEL (registered trademark)" series) and the like manufactured by Daicel Chemical Industries, Ltd., as the commercial item]. Furthermore, not only a monofunctional monomer but also a multifunctional monomer can be used. Specific examples of the multifunctional monomer include a monomer having a plurality of polymerizable double bonds and hydroxyl groups, such as pentaerythritol tri(meth)acrylate and dipentaerythritol penta(meth)acrylate. The term "(meth)acrylate" means "acrylate and/or methacrylate". Specific examples of the monomer having a urethane bond include multifunctional urethane (meth)acrylate. For example, "Ebecryl (registered trademark)" series manufactured by Daicel-Cytec Company, Ltd., "Aronix (registered trademark)" series manufactured by Toagosei Co., Ltd., and "KAYARAD (registered trademark)" series manufactured by Nippon Kayaku Co., Ltd. can be used as the commercial item.

A monomer capable of firmly forming the hydrogen bond of the cured resin is preferable as the component imparting a restoring force to the intermediate layer. Urethane (meth)acrylate such as polycaprolactone-modified active energy beam-curable urethane (meth)acrylate having a long-chain alkyl group having 13 to 25 carbon atoms is particularly suitable. The monomer is described in detail in JP3676280B and the like.

A monomer which is flexible and has a side chain having high motility is preferable as the component imparting impact absorption capacity to the intermediate layer. Examples of the monomer include alkyl (meth)acrylate having carbon atoms of 4 or greater in an alkyl group portion, and polyalkylene oxide mono(meth)acrylate having carbon atoms of 4 or greater in a polyalkylene oxide portion. A monomer in which a glass transition temperature of a homopolymer is 0° C. or less is preferable. Of these, the above-mentioned polyalkylene oxide mono(meth)acrylate is preferable. Specific examples thereof include polyethylene glycol mono(meth)acrylate, polypropylene glycol mono(meth)acrylate, and polytetramethylene glycol mono(meth)acrylate. The number of the repetition of alkylene oxide is determined as desired.

The content of the component which is included in the intermediate layer and contributes to the adhesion between the substrate or the surface layer and the intermediate layer is preferably 10 to 30 parts by mass based on 100 parts by mass of a resin component. The content of the component imparting a restoring force is preferably 40 to 80 parts by mass. The content of the component imparting impact absorption capacity is preferably 3 to 20 parts by mass. When the content of the component contributing to the adhesion is in the above-mentioned range, the adhesion between the surface layer and the intermediate layer is increased. Even when a pressing force is applied, the generation of interface peeling between the intermediate layer and the surface layer by shear deformation can be suppressed, to suppress the damage of the surface layer. When the content of the component imparting impact absorption capacity is 3 parts by mass or greater, good impact absorption capacity can be impaired to the intermediate layer, and the generation of damage such as breaking and the like on the surface layer can be suppressed. When the content is 20 parts by mass or less, strength reduction of the intermediate layer can be suppressed; scratch resistance can be improved; and breaking and peeling can be suppressed. When the content of the component imparting a restoring force is in the above-mentioned range, restoration of deformation and strain generated by applying a pressing force can be improved. Particularly, the intermediate layer has an excellent restoring force with respect to the repeatedly applied pressing force, and the damage of the nanoscale projecting part of the surface layer can be suppressed.

<Active Energy Beam Polymerization Initiator>

The active energy beam polymerization initiator is not particularly limited as long as it is a compound cleaved by irradiating it with the active energy beam to generate a radical that starts the polymerization reaction of the polymerization reactive monomer component. Herein, the term "active energy beam" means heat rays such as electron ray, ultraviolet ray, visible ray, plasma, and infrared ray. Particularly, the ultraviolet ray is preferably used from the perspectives of apparatus cost and productivity.

The kind and the used amount of the active energy beam polymerization initiator may be appropriately determined according to the requirements: for example, an environment in which the intermediate layer raw material is irradiated with the active energy beam is in the presence of oxygen or in a nitrogen atmosphere; alternatively, the surface of the intermediate layer is completely cured, or the surface thereof is incompletely cured to easily infiltrate the raw material constituting the surface layer.

Various known polymerization initiators described in JP2009-31764A, for example, can be used as the active energy beam polymerization initiator.

<Polymer>

Polymerization products of the various kinds of polymerization reactive monomer components previously described, for example, can be used as the polymer for forming the intermediate layer.

<Solvent>

The polymer is preferably used in a state where the polymer is dissolved in a solvent. The intermediate layer raw material may be diluted with the solvent if needed. Particularly, when it is difficult to uniformly apply the polymer having a high viscosity, it is preferable that the polymer is appropriately adjusted so that the polymer has a viscosity suitable for a coating method. The adhesion between the transparent substrate and the intermediate layer can be also improved by partially dissolving the surface of the transparent substrate in the solvent.

The solvent having an appropriate boiling point according to a drying method and the like may be selected. Specific examples of the solvent include alcohols such as toluene, methyl ethyl ketone, cyclohexanone, and isopropyl alcohol. These may be used alone or in combination.

<Other Components>

The intermediate layer may contain a resin other than the polymer obtained from the above-mentioned monomer, and additive agents such as an ultraviolet absorber, an antioxidant, a release agent, a lubricant, a plasticizer, an antistatic agent, a light stabilizer, a fire retardant, a fire-resistant auxiliary agent, a polymerization inhibitor, a filler, a silane coupling agent, a colorant, a reinforcing agent, an inorganic filler, an impact resistance modifier, and a near infrared absorber, if needed. Particularly, when the surface layer contains the antistatic agent, the ultraviolet absorber, and the near infrared absorber and the like, it may become difficult to maintain the shape of the nano uneven structure. Thereby, these additive agents are preferably contained in the intermediate layer without being contained in the surface layer in view of the scratch resistance and the reflection suppression of the laminate.

The antistatic agent suppresses the adhesion of dust and the like to the laminate. Examples of the antistatic agent include conductive polymers such as a polythiol-based conductive polymer, polythiophene-based conductive polymer, and a polyaniline-based conductive polymer; inorganic substance fine particles such as carbon nanotube and carbon black; and a lithium salt and a quarternary ammonium salt exemplified in JP2007-70449A. These may be used in combination. Of these, a perfluoroalkyl acid lithium salt is preferable, which is comparatively inexpensive and exhibits stable performance without impairing the transparency of the laminate.

The additive amount of the antistatic agent is preferably 0.5 to 20 parts by mass based on 100 parts by mass of a polymerizable component or a polymer in the intermediate layer raw material (that is, 100 parts by mass of the polymer in the intermediate layer), and more preferably 1 to 10 parts by mass. The lower limit values of these ranges have a meaning in that a surface resistance value of the laminate is lowered and dust adhesion prevention performance is exhibited. The upper limit values thereof have a meaning in view of an extent of improvement of performance per the additive amount and cost. The thickness of the surface layer laminated on the intermediate layer is preferably set to 100 μm or less in order to exhibit good antistatic performance, and particularly preferably 50 μm or less.

The near infrared absorber can impart an adiabatic effect to the laminate. When the laminate is used for a plasma display and the like, erroneous operation of infrared remote control of various electrical household appliances can be suppressed. Examples of the near infrared absorber include organic dyes such as a diimonium-based dye, a phthalocyanine-based dye, a dithiol-based metal complex-based dye, a substituted benzene dithiol metal complex-based dye, a cyanine-based dye, and squarylium-based dye; and inorganic oxide fine particles such as conductive antimony-containing tin oxide fine particles, conductive tin-containing indium oxide fine particles, tungsten oxide fine particles, and composite tungsten oxide fine particles. These may be used in combination.

These additive agents may be added to the surface layer of the laminate. However, the additive agents are preferably added to the intermediate layer without adding the additive agents to the surface layer, and thereby the inhibition of the shape maintenance of the nano uneven surface can be suppressed, and the generation of bleed out can be suppressed with time.

The viscosity of the intermediate layer raw material or the polymer dissolved in the solvent may be adjusted to the optimal value according to the coating method. An appropriate coating method may be selected according to the viscosity. For example, when the intermediate layer raw material or the polymer has a viscosity of 50 mPa·s or less, the intermediate layer raw material or the polymer can be uniformly applied on the transparent substrate by gravure coating.

The intermediate layer can be formed by applying the intermediate layer raw material described above on the substrate and irradiating the intermediate layer raw material with the active energy beam, or by applying the polymer dissolved in the solvent, and drying and removing the solvent. Ultraviolet ray is preferably used as the active energy beam from the perspectives of apparatus cost and productivity. The amount of irradiation of the ultraviolet ray may be appropriately determined according to the amount of the initiator contained in the intermediate layer raw material. The irradiation environment of the ultraviolet ray may be in the presence of oxygen, or may be in a nitrogen atmosphere. The curing of the surface is daringly conducted to an incomplete state, and thereby the adhesion between the surface layer and the intermediate layer can be also improved. An integrated amount of light is 200 to 4000 mJ/cm$^2$ as a measure.

[Surface Layer]

The surface layer is a top layer laminated on the substrate with the intermediate layer sandwiched therebetween. The surface layer is typically a cured resin film formed by an active energy beam-curable resin composition.

The thickness of the surface layer is preferably 0.4 to 1.5 times that of the intermediate layer, more preferably 0.5 to 1.5 times, and particularly preferably 0.8 to 1.2 times. When the thickness of the surface layer is moderately thin, the curing sufficiently progresses with the irradiation of usual ultraviolet ray. When the surface layer is moderately thick, the easy fracture of the surface layer can be also avoided. It is preferable that the thickness of the surface layer is a thickness at which the active energy beam goes sufficiently into the uncured surface, layer to cause the curing of the surface layer efficiently and uniformly when the surface layer is cured and formed by the irradiation of the active energy beam, and is a thickness for dispersing energy against a pressing force, generating deforming strain, and enabling restoration. Specifically, the thickness is preferably 6 to 29 and more preferably 8 to 21 μm. The measured value obtained by the same measuring method as that of the above-mentioned intermediate layer can be employed as the thickness of the surface layer. The thickness of the surface layer is a distance between the interface of the intermediate layer and the tip of the projecting part.

For example, when the laminate having the flexible intermediate layer is pushed in, the intermediate layer can be compressed and deformed to avoid flaws. However, the surface layer may be fractured by tension in a process in which the surface layer follows the compression deformation of the intermediate layer. Particularly, in order to form the nano uneven structure on the surface layer successfully, the cured resin must be a resin having high cross-link density and high elasticity. It is difficult for the cured resin having high cross-link density to produce tensile elongation, and tensile fracture elongation is generally 5% or less. When a point load is applied to the laminate having the surface layer made of the resin and the flexible intermediate layer, the surface layer is fractured by tension before the intermediate layer is compressed and broken. After the intermediate layer is restored, fine cracks are left as flaws which can be visually confirmed. On the other hand, because the thickness of the surface layer is moderately thick with respect to that of the intermediate layer in the present invention, the tensile fracture of the surface layer can be avoided. Particularly, a good result can be obtained when the thickness of the surface layer is in the above preferable range.

When the surface layer is very thick with respect to the thickness of the intermediate layer, a stress applied to the laminate is not appropriately dispersed by the intermediate layer, and the cured resin of the surface layer is damaged. When the thickness of the surface layer is moderately thinned with respect to the thickness of the intermediate layer, the stress is well dispersed, and temporary recessed flaws can be restored. Particularly, a good result can be obtained when the thickness of the surface layer is in the above preferable range.

It is preferable that the intermediate layer and the surface layer are sufficiently closely adhered in order for the surface layer to follow well the deformation of the intermediate layer. When the adhesion between both the layers is sufficient, the interface peeling caused by the shear deformation is hardly generated. A mixed state in which a clear interface does not exist may exist between the intermediate layer and the surface layer. The surface of the intermediate layer is insufficiently cured, and the active energy beam-curable resin composition of the surface layer is infiltrated into the intermediate layer. Thereby, good adhesion can be produced without making the clear interface exist. The thickness of both the layers when the clear interface does not exist is obtained by measuring the intermediate position of the mixed portion between the intermediate layer and the surface layer as an interface. The adhesion can be also improved by applying heat when the surface layer is formed.

A ratio (MG/SG) of a storage modulus (MG) of the intermediate layer to a storage modulus (SG) of the surface layer as measured under a condition of a vibration frequency of 1 Hz at 20° C. is preferably 0.003 or greater and 0.14 or less, and more preferably 0.01 or greater and 0.08 or less. In this case, the intermediate layer can absorb strain caused by the pressing force to the surface, remarkably improve the scratch resistance of the surface layer, and suppress the generation of damages such as breakings on the surface layer. When the surface layer has the nano uneven structure, the tensile fracture elongation is generally 5% or less. When the pressing force is applied to the surface layer, the surface layer is apt to crack or damage. On the other hand, when the surface layer has a specific storage modulus in the relation between the surface layer and the intermediate layer, the scratch resistance can be remarkably improved, which can maintain an antireflective property and a lotus effect caused by the nano uneven structure for the long term.

An intermediate layer material and a surface layer material are each molded into films having a thickness of 500 μm. The films are punched in a 5 mm wide strip to prepare an intermediate layer specimen and a surface layer specimen. As for the storage modulus, the specimens are used and measured under conditions of a tensile mode, a distance between chucks: 2 cm, and a temperature rise speed at −50 to 100° C. at a vibration frequency of 1 Hz: 2° C./min using a dynamic mechanical spectrometer DMS110 (manufactured by Seiko Instruments Inc.). MG/SG can be obtained from a measured value (MG) of the intermediate layer specimen at 20° C., and a measured value (SG) of the surface layer specimen.

As for the intermediate layer and the surface layer, a ratio (mg/sg) of the minimum value (mg) of a storage modulus of a rubber-like flat region of the intermediate layer to the minimum value (sg) of a storage modulus of a rubber-like flat region of the surface layer measured under a condition of a vibration frequency of 1 Hz using the dynamic mechanical spectrometer is preferably 0.009 or greater and 0.05 or less, and more preferably 0.022 or greater and 0.045 or less. The relationship between the minimum values of the storage moduli of the rubber-like flat regions of the intermediate layer and the surface layer can reduce breaking or falling of a projection of the structure of the nano uneven surface. The storage moduli of the intermediate layer and the surface layer can be adjusted by selecting materials and cross-link density thereof, and the like.

The rubber-like flat region is a region where a change in a storage modulus is small with respect to a temperature change on a temperature side higher than a glass transition point in viscoelasticity measurement.

The material of the surface layer having the nano uneven structure on its surface is preferably a high elastic resin having high cross-link density. The polymerizable components of the resin are described in JP2009-31764A and the like. Examples of the polymerizable component include monomers, oligomers and reactive polymers which have a radically polymerizable bond or a cationically polymerizable bond in a molecule.

The monomer having a radically polymerizable bond may be a monofunctional or multifunctional monomer. Specific examples of the monofunctional monomer include (meth)acrylate derivatives such as methyl (meth)acrylate, ethyl (meth)acrylate, propyl (meth)acrylate, n-butyl (meth)acrylate, i-butyl (meth)acrylate, s-butyl (meth)acrylate, t-butyl (meth)acrylate, 2-ethylhexyl (meth)acrylate, lauryl (meth)acrylate, alkyl (meth)acrylate, tridecyl (meth)acrylate, stearyl (meth)acrylate, cyclohexyl (meth)acrylate, benzyl (meth)acrylate, phenoxyethyl (meth)acrylate, isobornyl (meth)acrylate, glycidyl (meth)acrylate, tetrahydrofurfuryl (meth)acrylate, allyl (meth)acrylate, 2-hydroxyethyl (meth)acrylate, hydroxypropyl (meth)acrylate, 2-methoxyethyl (meth)acrylate, and 2-ethoxyethyl (meth)acrylate; (meth)acrylic acid and (meth)acrylonitrile; styrene derivatives such as styrene and α-methylstyrene; and (meth)acrylamide derivatives such as (meth)acrylamide, N-dimethyl (meth)acrylamide, N-diethyl (meth)acrylamide, and dimethylaminopropyl (meth)acrylamide.

Specific examples of the multifunctional monomer having a radically polymerizable bond include bifunctional monomers such as ethylene glycol di(meth)acrylate, tripropylene glycol di(meth)acrylate, ethylene oxide isocyanurate-modified di(meth)acrylate, triethylene glycol di(meth)acrylate, diethylene glycol di(meth)acrylate, neopentyl glycol di(meth)acrylate, 1,6-hexanediol di(meth)acrylate, 1,5-pentanediol di(meth)acrylate, 1,3-butylene glycol di(meth)acrylate, polybutylene glycol di(meth)acrylate, 2,2-bis(4-(meth)acryloxypolyethoxy phenyl)propane, 2,2-bis(4-(meth)acryloxyethoxyphenyl)propane, 2,2-bis(4-(3-(meth)acryloxy-2-hydroxypropoxy)phenyl)propane, 1,2-bis(3-(meth)acryloxy-2-hydroxypropoxy)ethane, 1,4-bis(3-(meth)acryloxy-2-hydroxypropoxy)butane, dimethylol tricyclodecane di(meth)acrylate, ethylene oxide adduct of bisphenol A di(meth)acrylate, propylene oxide adduct of bisphenol A di(meth)acrylate, hydroxy pivalic acid neopentyl glycol di(meth)acrylate, divinyl benzene, and methylenebisacrylamide; trifunctional monomers such as pentaerythritol tri(meth)acrylate, trimethylolpropane tri(meth)acrylate, trimethylolpropane ethylene oxide-modified tri(meth)acrylate, trimethylolpropane propylene oxide-modified triacrylate, trimethylolpropane ethylene oxide-modified triacrylate, and ethylene oxide isocyanurate-modified tri(meth)acrylate; tetra- or higher functional monomers such as a condensation reaction mixture of succinic acid/trimethylolethane/acrylic acid, dipentaerythritol hexa(meth)acrylate, dipentaerythritol penta(meth)acrylate, ditrimethylolpropane tetraacrylate, and tetramethylolmethane tetra(meth)acrylate; and bi- or higher functional urethane acrylate, and bi- or higher functional polyester acrylate.

Examples of the monomers having a cationically polymerizable bond include monomers having an epoxy group, an oxetanyl group, an oxazolyl group, and a vinyloxy group. Of these, the monomers having an epoxy group are preferable.

Specific examples of the oligomers or reactive polymers having a radically polymerizable bond and/or a cationically polymerizable bond in a molecule include unsaturated polyesters such as a condensate of an unsaturated dicarboxylic acid and a polyhydric alcohol; polyester (meth)acrylate, polyether (meth)acrylate, polyol (meth)acrylate, epoxy (meth)acrylate, urethane (meth)acrylate, cationic polymerization types of epoxy compounds, polymerizable homopolymers or copolymers of the above-described monomers having the radically polymerizable bond at a side chain.

Known polymerization initiators can be used as the polymerization initiator used for the active energy beam-curable resin composition containing the above-mentioned polymerizable components. It is preferable that the polymerization initiator is appropriately selected according to the kind of the active energy beam used when the active energy beam-curable resin composition is cured.

For example, when a photocuring reaction is used, examples of the photopolymerization initiator include carbonyl compounds such as benzoin, benzoin methyl ether, benzoin ethyl ether, benzoin isopropyl ether, benzoin isobutyl ether, benzyl, benzophenone, p-methoxybenzophenone, 2,2-diethoxyacetophenone, α,α-dimethoxy-α-phenylecetophenone, methyl phenyl glyoxylate, ethyl phenyl glyoxylate, 4,4'-bis(dimethylamino)benzophenone, and 2-hydroxy-2-methyl-1-phenylpropan-1-one; sulfur compounds such as tetramethylthiuram monosulfide and tetramethylthiuram disulfide; and 2,4,6-trimethylbenzoyl diphenyl phosphinoxide and benzoyl diethoxy phosphinoxide. These may be used alone or in combination of two or more kinds thereof.

When an electron ray curing reaction is used, examples of the polymerization initiator include thioxanthone such as benzophenone, 4,4-bis(diethylamino)benzophenone, 2,4,6-trimethylbenzophenone, methyl ortho-benzoylbenzoate, 4-phenylbenzophenone, t-butyl anthraquinone, 2-ethyl anthraquinone, 2,4-diethyl thioxanthone, isopropyl thioxanthone, and 2,4-dichloro thioxanthone; acetophenones such as diethoxy acetophenone, 2-hydroxy-2-methyl-1-phenylpropan-1-one, benzyl dimethyl ketal, 1-hydroxycyclohexyl-phenyl ketone, 2-methyl-2-morpholino(4-thiomethylphenyl)propan-1-one, and 2-benzyl-2-dimethylamino-1-(4-morpholinophenyl)butanone; benzoin ethers such as benzoin methyl ether, benzoin ethyl ether, benzoin isopropyl ether, and benzoin isobutyl ether; acyl phosphinoxide such as 2,4, 6-trimethylbenzoyl diphenyl phosphinoxide, bis(2,6-dimethoxybenzoyl)-2,4,4-trimethylpentyl phosphinoxide, and bis(2,4,6-trimethylbenzoyl)-phenyl phosphinoxide; methylbenzoyl formate, 1,7-bisacrydinylheptane, and 9-phenylacrydine. Theses may be used alone or in combination of two or more kinds thereof.

The content of the polymerization initiator in the active energy beam-curable resin composition is preferably 0.1 to 10 parts by mass based on 100 parts by mass of the polymerization reactive compound. When the content of the polymerization initiator is less than 0.1 parts by mass, it is difficult for polymerization to proceed. When the content of the polymerization initiator exceeds 10 parts by mass, the resin layer (nano uneven structure) may be colored or a mechanical strength may decrease.

The active energy beam-curable resin composition may contain a nonreactive polymer. Examples of the nonreactive polymer include acrylic resins, styrene-based resins, polyurethane resins, cellulose resins, polyvinyl butyral resins, polyester resins, and thermoplastic elastomers.

The active energy beam-curable resin composition may be a sol-gel reactive composition. Examples of the active energy beam sol-gel reactive composition include alkoxy silane compounds and alkyl silicate compounds.

Examples of the alkoxy silane compound include compounds represented by RxSi(OR')y. R and R' each represent alkyl groups having 1 to 10 carbon atoms, and x and y each represent an integer satisfying the relationship of x+y=4. Specific examples of the alkoxy silane compound include tetramethoxysilane, tetra-iso-propoxysilane, tetra-n-propoxysilane, tetra-n-butoxysilane, tetra-sec-butoxysilane, tetra-tert-butoxysilane, methyltriethoxysilane, methyltripropoxysilane, methyltributoxysilane, dimethyldimethoxysilane, dimethyldiethoxysilane, trimethylethoxysilane, trimethylmethoxysilane, trimethylpropoxysilane, and trimethylbutoxysilane.

Examples of the alkyl silicate compound include compounds represented by $R^1O[Si(OR^3)(OR^4)O]zR^2$. $R^1$ to $R^4$ each represent alkyl groups having 1 to 5 carbon atoms, and z represents an integer of 3 to 20. Specific examples of the alkyl silicate compound include methyl silicate, ethyl silicate, iso-propyl silicate, n-propyl silicate, n-butyl silicate, n-pentyl silicate, and acetyl silicate.

The surface layer may contain acrylic resins, styrene-based resins, polyurethane resins, cellulose resins, polyvinyl butyral resins, polyester resins, thermoplastic elastomers, and the like, other than the above-mentioned monomer polymers, if needed. The surface layer may contain an ultraviolet absorber, an antioxidant, a release agent, a lubricant, a plasticizer, an antistatic agent, a light stabilizer, a fire retardant, a fire-resistant auxiliary agent, a polymerization inhibitor, a filler, a silane coupling agent, a colorant, a reinforcing agent, an inorganic filler, and an impact resistance modifier, if needed.

[Nano Uneven Structure]

Figure 1:
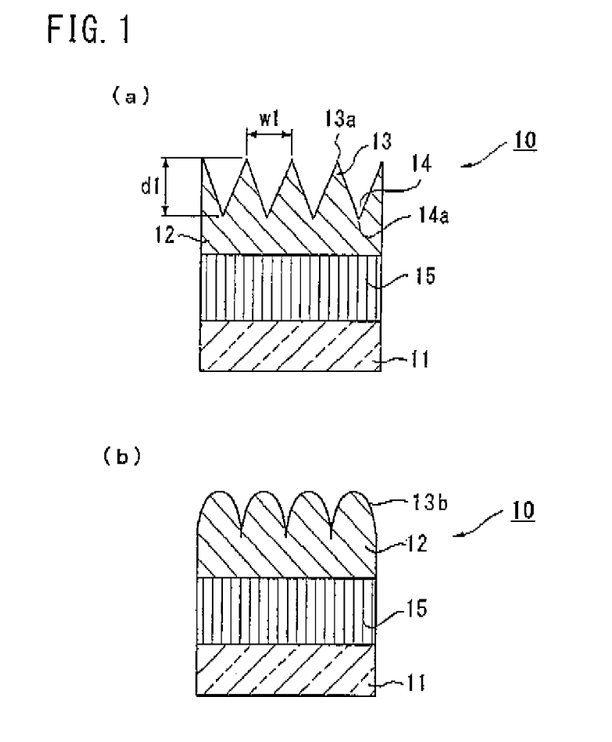
FIG. 1 is a schematic sectional view showing an embodiment of a laminate of the present invention.

FIGS. 1(a) and 1(b) are schematic sectional views showing an embodiment of the laminate of the present invention. In FIG. 1, a laminate 10 is exemplified, which is obtained by sequentially laminating an intermediate layer 15 and a surface layer 12 on a transparent substrate 11. The surface of the surface layer 12 may be smooth. However, as shown in FIG. 1, the surface of the surface layer 12 preferably has a nano uneven structure exhibiting functions such as a surface antireflective property and water repellency. Specifically, projecting parts 13 and recessed parts 14 are formed at equal intervals on the surface of the surface layer 12. Particularly, the projecting part 13 of FIG. 1(a) has a conical or pyramidal shape. The projecting part 13 of FIG. 1(b) has a campanulate shape. The shape of the projecting part 13 of the nano uneven structure is not limited thereto. The projecting part 13 may have a structure where the occupancy of the cross-sectional area of the surface layer 12 when the surface layer 12 is cut at the film surface thereof is continuously increased. Finer projecting parts may be agglomerated to form the nano uneven structure. That is, the projecting part 13 may have a shape other than those of FIGS. 1(a) and 1(b) as long as the shape that allows continuous increase in a refractive index from air to the surface of the material and exhibits antireflective performance combining low reflectance with low wavelength dependency. Particularly, the projecting part preferably has a shape such that the cross-sectional area of the projecting part is continuously increased toward the bottom part of the projecting part from the top part thereof when the projecting part is cut at a plane perpendicular to the height direction of the projecting part. Examples of the shape include a conical shape, a pyramidal shape, and a campanulate shape. Finer projections may be agglomerated to form the above-mentioned nano uneven structure.

In order to exhibit good antireflective performance, intervals between the adjacent projecting parts 13 or recessed parts 14 of the nano uneven structure [intervals w1 between central points (tops) 13a of the adjacent projecting parts in FIG. 1(a)] need to be a size equal to or less than a wavelength of visible light. Herein, the term "visible light" refers to light having a wavelength of 380 to 780 nm. When the interval w1 is 400 nm or less (more preferably 380 nm or less), the scattering of the visible light can be suppressed. In this case, the laminate of the present invention can be suitably used for optical applications such as an antireflection film. Because the scattering of the visible light is generated when the interval w1 of the nano uneven structure is greater than 400 nm, the laminate is not suitable for the optical applications such as the antireflection film. The lower limit value of the interval w1 may be in a range where the nano uneven structure can be manufactured, and is not particularly limited. When a nano uneven shape is formed by a transferring method using a mold, the interval w1 is preferably 20 nm or greater in view of the manufacturing easiness of the mold, and more preferably 40 nm or greater. An aspect ratio represented by height/interval w1 is preferably 0.5 or greater in view of suppressing the rise of a minimum reflectance or a reflectance at a specific wavelength, more preferably 0.8 or greater, and particularly preferably 1.2 or greater. The lower limit values of these aspect ratios have a meaning in view of reduction in light reflection and reduction in incidence angle dependency. As long as the upper limit values of the aspect ratios are in a range where the nano uneven structure can be manufactured, the upper limit values are not particularly limited. When a nano uneven shape is formed by a transferring method using a mold, the aspect ratio of the projecting part is preferably 5 or less in order to correctly transfer the nano uneven shape. The height of the projecting part or the depth of the recessed part (a perpendicular distance d1 between a central point (bottom point) 14a of the recessed part and a central point (top) 13a of the projecting part in FIG. 1(a)) is preferably 60 nm or greater, and more preferably 90 nm or greater. The shape and the manufacturing method of the nano uneven structure exhibiting good antireflective performance, and the like are described in JP2009-31764A and the like. The same shape and manufacturing method as those described in JP2009-31764A and the like can be used also in the present invention.

As the size of the nano uneven structure of the surface, platinum is vapor-deposited on the vertical cross-section of the nano uneven structure for 10 minutes. The vertical cross-section is observed using a field emission-type scanning electron microscope (JSM-7400F: manufactured by JEOL Ltd.) at an accelerating voltage of 3.00 kV, whereby intervals (periods) between the adjacent micropores and the depth of the micropores are measured. Each of the measurements was performed for 10 spots, and the average value thereof can be employed.

The refractive index $n_1$ of the surface layer is preferably 1.40 or greater, more preferably 1.43 or greater, and most preferably 1.49 or greater. The above-mentioned lower limit values of the refractive indices $n_1$ of the cured product have a meaning in view of a reflective reduction effect. The refractive index $n_1$ of the cured product is preferably 1.55 or less, and more preferably 1.52 or less. The above-mentioned upper limit values of the refractive indices $n_1$ of the cured product have a meaning in view of suppressing reduction in transparency and coloring, and of suppressing the viscosity increase and the solidification of the pre-cured resin composition. When the viscosity of the resin composition is high, transferability is reduced in the case where the nano uneven shape is formed by the transferring method using the mold. As a result, this may cause an increase in a reflectance.

When the resin composition is cast into the stamper and is cured in the nano uneven structure forming step, the viscosity of the resin composition measured by a rotary B-type viscosity meter at 25° C. is preferably 10000 mPa·s or less in light of the workability thereof, more preferably 5000 mPa·s or less, and particularly preferably 2000 mPa·s or less. If the resin composition can be previously heated to lower a viscosity when the resin composition is cast into the stamper, the resin composition can be used without impairing the workability even if the viscosity of the resin composition is 10000 mPa·s or greater. The viscosity of the resin composition measured by the rotary B-type viscosity meter at 70° C. is preferably 5000 mPa·s or less, and more preferably 2000 mPa·s or less.

When the nano uneven structure is continuously produced using the stamper having a belt shape or a roll shape in the nano uneven structure forming step, the viscosity of the resin composition measured by the rotary B-type viscosity meter at 25° C. is preferably 100 mPa·s or greater in light of the workability thereof, more preferably 150 mPa·s or greater, and particularly preferably 200 mPa·s or greater. These ranges have a meaning in that the resin composition is hard to exceed the width of the stamper to leak to the side in the step of pressing the stamper, or the thickness of the cured product thereof tends to be arbitrarily adjusted.

The viscosity of the resin composition can be adjusted by adjusting the kind and the content of the monomer. Specifically, when a monomer containing a functional group and a chemical structure having intermolecular interaction such as a hydrogen bond is used in a large amount, the viscosity of the resin composition is increased. When a low molecular weight monomer having no intermolecular interaction is used in a large amount, the viscosity of the resin composition is reduced.

When the cured resin composition is soft, the nano size projections may be disposed close to each other during peeling off or after peeling off from the stamper forming the nano uneven structure. Surface tension causing no problem in a macro region notably acts on the projections in a nano region. That is, a force for disposing the nano size projections close to each other to reduce the surface area acts on the projections to reduce surface free energy. When the force exceeds the hardness of the resin composition, the projections are disposed close to each other to adhere to each other. The nano uneven structure body may not have functionalities such as desired antireflective performance and water repellency.

The tensile elastic modulus of the cured resin composition is preferably 1 GPa or greater from the above-mentioned views. When the resin composition is used, the disposal of the projections close to each other tends to be avoided.

The laminate of the present invention is optimal as a functional article having the nano uneven structure on the surface layer. Examples of the functional article include an antireflection article and a water-repellent article provided with the laminate of the present invention. Particularly, a display and an automotive member provided with the laminate of the present invention are suitable as the functional article.

[Antireflection Article]

The antireflection article of the present invention is provided with the laminate having the nano uneven structure on the surface layer of the present invention. The antireflection article exhibits high scratch resistance and good antireflective performance. For example, the antireflection article is used in a state where the laminate having the nano uneven structure is stuck on the surfaces of objects such as image display devices such as a liquid crystal display device, a plasma display panel, an electroluminescence display, and a cathodic tube display device, a lens, a shop window, and an eyeglass lens.

[Water-Repellent Article]

The water-repellent article of the present invention is provided with the laminate having the nano uneven structure on the surface layer of the present invention. The water-repellent article has high scratch resistance and good water repellency, and exhibits excellent antireflective performance. For example, the water-repellent article is used in a state where the laminate having the nano uneven structure is stuck on the surfaces of a window material, a roofing tile, outdoor lighting, a convex mirror, a vehicle window, and a vehicle mirror.

When a portion on which the laminate of each of the above-mentioned object articles is to be stuck has a three-dimensional shape, the laminate may be previously obtained by using a transparent substrate having a shape corresponding to the three-dimensional shape, and forming an intermediate layer and a surface layer on the transparent substrate, and then the laminate is stuck on the predetermined portion of the object article.

When the object article is the image display device, the laminate of the present invention may be stuck not only on the surface of the image display device but on the front plate thereof. The front plate itself can be formed of the laminate of the present invention.

The laminate of the present invention can be also applied to optical applications such as an optical waveguide, a relief hologram, a lens, and a polarization separating element, and applications such as a cell culture sheet, for example, in addition to the above-mentioned applications.

<Manufacturing Method>

A laminate of the present invention can be manufactured by, for example, an intermediate layer forming step of applying an intermediate layer raw material on a transparent substrate and irradiating the intermediate layer raw material with an active energy beam to completely cure a coating of the intermediate layer raw material or cure the coating up to a state not reaching complete curing, and a surface layer forming step of disposing an active energy beam-curable resin composition on the intermediate layer and irradiating the active energy beam-curable resin composition with an active energy beam to cure the active energy beam-curable resin composition.

First, the intermediate layer forming step will be described. This forming method includes main three steps. For example, the steps are a step of applying the intermediate layer raw material to the substrate, a drying step of volatilizing a solvent in the case of using the solvent, and a step of irradiating the intermediate layer raw material with the active energy beam to cure the intermediate layer raw material.

(Applying Step)

First, the intermediate layer raw material is applied on the transparent substrate to form the coating made of the intermediate layer raw material. The applying method is not particularly limited. An optimal method may be selected from known coating methods in view of the flexibility of the substrate and the viscosity of the intermediate layer raw material. Specifically, for example, the thickness of the coating is suitably controlled by an air knife when the intermediate layer raw material is applied, or the intermediate layer raw material is suitably applied by gravure coating. The known coating method is described in detail, for example, in JP01-216837A and the like.

(Drying Step)

When the intermediate layer raw material contains the solvent, it is necessary to dry the coating formed on the transparent substrate to volatilize and remove the solvent. For example, the volatilization of the solvent may be promoted by heating or reduced pressure. However, because only the surface side of the coating may be dried in rapid drying, to leave the solvent inside the coating, care should be taken. Specifically, an appropriate drying method may be selected according to the kind and content of the solvent. Because the deformation of the transparent substrate may be generated by heating, care should be taken.

(Curing Step)

Next, the coating made of the intermediate layer raw material formed on the transparent substrate is cured, to form the intermediate layer. For example, when the intermediate layer raw material is a material containing a polymerization reactive monomer component and an active energy beam polymerization initiator, the intermediate layer raw material may be irradiated with the active energy beam to polymerize and cure the intermediate layer raw material.

As the active energy beam, ultraviolet ray is preferable. Examples of a lamp for irradiating the intermediate layer raw material with the ultraviolet ray include a high pressure mercury lamp, a metal halide lamp, and a fusion lamp. The amount of irradiation of the ultraviolet ray may be determined according to the absorption wavelength and content of the polymerization initiator. Usually, the integrated amount of light thereof is preferably 200 to 4000 mJ/cm$^2$, and more preferably 400 to 2000 mJ/cm$^2$. The lower limit values of these ranges have a meaning in view of sufficiently curing the intermediate layer raw material to prevent reduction in the scratch resistance of the laminate caused by insufficient curing. The upper limit values thereof have a meaning in view of preventing the coloring of the intermediate layer and the deterioration of the transparent substrate. Although the irradiation intensity is not also particularly limited, the irradiation intensity is preferably suppressed to output not to cause the deterioration and the like of the transparent substrate.

For example, in the intermediate layer forming step, the intermediate layer raw material is irradiated with the ultraviolet ray in the presence of oxygen to cure the coating of the intermediate layer raw material up to a state not reaching complete curing, and thereafter the surface layer forming step is performed. This is also a suitable embodiment. Because the active energy beam-curable resin composition as a surface layer raw material infiltrates the incompletely cured intermediate layer to some extent in the surface layer forming step in this case, the adhesion of the surface layer and the intermediate layer is improved.

The surface layer is formed on the intermediate layer formed as described above. The surface layer is preferably a layer having a nano uneven structure. For example, the active energy beam-curable resin composition is interposed between a stamper having a reversal structure of the nano uneven structure and the intermediate layer formed on the above-mentioned transparent substrate. The active energy beam-curable resin composition is irradiated with an active energy beam to cure the active energy beam-curable resin composition. The stamper is peeled off from a layer formed of the cured product. Thereby, the surface layer having the nano uneven structure formed of the cured product can be formed. For example, a known technique described in JP2009-31764A and the like may be employed for the detail of the manufacturing method of the nano uneven structure and the manufacturing method of the stamper used therefor. More specifically, the nano uneven structure is preferably formed by a transfer method using the stamper having the reversal structure of the nano uneven structure. The nano uneven structure can be simply transferred to a molded product in one step by using the stamper.

Although a method for transferring the reversal structure of the stamper to the surface of the molded product is not particularly limited, the following method is preferable. An uncured active energy beam-curable resin composition is interposed between the stamper and the transparent substrate. The active energy beam-curable resin composition is irradiated with an active energy beam to cure the active energy beam-curable resin composition. The stamper is then released. A molded product having a surface having the transferred nano uneven structure is obtained by the method.

The stamper has a surface having the reversal structure of the nano uneven structure formed thereon. Examples of the material of the stamper include a metal (including a metal having a surface having an oxide coating formed thereon), quartz, glass, a resin, and ceramics. Examples of the shape of the stamper include a roll shape, a cylindrical tube shape, a flat plate shape, and a sheet shape. The nano uneven structure of the stamper is the reversal structure of the nano uneven structure formed on the surface layer. Platinum is vapor-deposited on a part of a vertical cross-section of the stamper for 1 minute in the measurement of the size thereof. Then, a measured value obtained by the same measuring method as that of the measurement of the size of the nano uneven structure of the above-mentioned surface layer can be employed.

Examples of the manufacturing method of the stamper include an electron ray lithography method and a laser beam interference method. An anodic oxidation method is preferable in view of enabling simple production of the stamper having a large area and the stamper having a roll shape.

Figure 2:
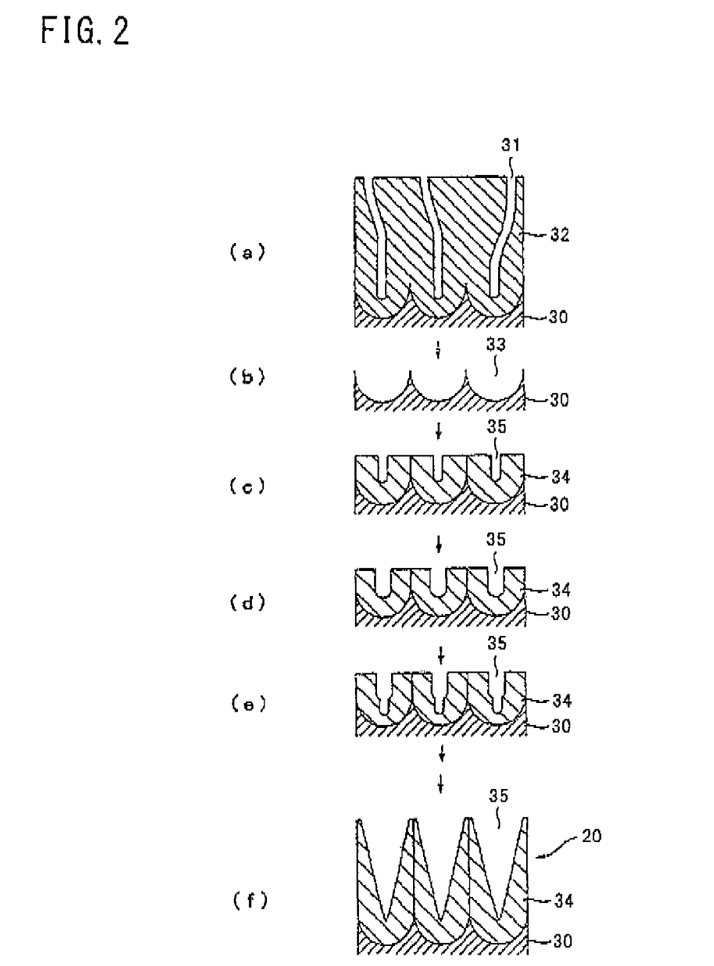
FIG. 2 is a schematic sectional view showing an example of a manufacturing step of a stamper used in order to form a nano uneven structure.

The anodic oxidation method can be performed by following steps (a) to (e) as shown in FIG. 2, for example.

An aluminum substrate having purity of greater than 99.0% is preferably used herein, and the purity is more preferably 99.5% or greater, and still more preferably 99.9% or greater. When aluminum purity is greater than 99.0%, micropores formed by anodic oxidization are regularly formed without causing branches of the micropores. A pretreatment for dipping the aluminum substrate in a chromic acid and phosphoric acid mixed solution, and the like can be also performed before the step (a), in order to remove the oxide coating of a flat surface or a curved surface (hereinafter also referred to as a surface to be processed) of the aluminum substrate forming the reversal structure of the nano uneven structure.

The stamper made of anodized porous alumina can be manufactured through the following steps (a) to (e), for example (see FIG. 2). The flat surface or the curved surface of the aluminum substrate to which the reversal structure of the nano uneven structure is applied is referred to as a surface to be processed.

Step (a): a first oxide coating forming step of anodizing the surface to be processed of an aluminum substrate in an electrolysis solution under a constant voltage to form a first oxide coating having micropores on the surface to be processed.

Step (b): an oxide coating removing step of entirely removing the formed first oxide coating to form micropore generation points of the anodic oxidization on the surface to be processed.

Step (c): a second oxide coating forming step of re-anodizing the surface to be processed of the aluminum substrate on which the micropore generation points are formed, in the electrolysis solution under a constant voltage, to form a second oxide coating having the micropores corresponding to the micropore generation points, on the surface to be processed.

Step (d): a pore diameter enlarging step of partially removing the second oxide coating to enlarge the pore diameters of the formed micropores.

Step (e): a step of repeating the above-mentioned steps (c) and (d).

Step (a):

As shown in FIG. 2(a), in the step (a), a surface 30 to be processed of the aluminum substrate rendered into a mirror surface is anodized in the electrolysis solution under a constant voltage, to form a first oxide coating 32 having micropores 31 on the surface 30 to be processed of the aluminum substrate. The thickness of the first oxide coating 32 is preferably 10 µm or less.

When the anodic oxidization is performed at a higher voltage, the diameters of micropores can be enlarged. Examples of the electrolysis solution to be used include an acidic electrolysis solution or an alkaline electrolysis solution. The acidic electrolysis solution is preferable. Sulfuric acid, oxalic acid, phosphoric acid, or a mixture thereof can be used as the acidic electrolysis solution.

When the oxalic acid is used as the electrolysis solution, for example, the concentration of the oxalic acid is preferably 6.5% by mass or less as the reaction condition. When the concentration of the oxalic acid is 6.5% by mass or less, a current value during the anodic oxidization is high, which can suppress the formation of an oxide coating having a coarse surface. A voltage during the anodic oxidization is set to 30 to 60 V. Thereby micropores having a period of about 100 nm and having high regularity are formed. This produces the nano uneven structure having regularity, and thereby a laminate having high water repellency is obtained.

The temperature of the electrolysis solution is preferably 50° C. or less, and more preferably 35° C. or less. A phenomenon referred to as so-called "burn" generated when the temperature of the electrolysis solution is greater than 50° C. can be suppressed, and the micropores having regularity can be formed.

Step (b)

The first oxide coating 32 formed by the step (a) is entirely removed, to form periodic dents 33 so as to correspond to the micropores 31 on the bottom part (referred to as a barrier layer) of the removed first oxide coating. The dents 33 serve as the micropore generation points of the anodic oxidization, and can improve the regularity of the finally formed nano uneven structure (for example, see Masuda, "OYO BUTURI", Vol. 69, No. 5, p. 558 (2000)).

Examples of the method for entirely removing the first oxide coating 32 include a method for removing the first oxide coating 32 using a solution selectively dissolving alumina without dissolving aluminum. Examples of the solution include a chromic acid and phosphoric acid mixed solution.

Step (c):

The surface 30 to be processed of the aluminum substrate on which the micropore generation points 33 are formed is re-anodized in the electrolysis solution under a constant voltage, to form a second oxide coating 34 having cylindrical micropores 35 corresponding to the micropore generation points. The surface 30 to be processed may be anodized under the same conditions (an electrolysis solution concentration, an electrolysis solution temperature, a formation voltage and the like) as those of the step (a) in the step (c). When the surface 30 to be processed is anodized for a longer time also in the step (c), deep micropores can be obtained. When the aluminum substrate is used as the stamper for transferring the nano uneven structure, an oxide coating having a thickness of about 0.01 to about 0.5 µm may be formed in the step (c). It is not necessary to form the oxide coating having the thickness formed in the step (a). When the surface 30 to be processed is anodized for a longer time also in the step (c), deep micropores can be obtained. As the stamper for transferring the nano uneven structure, an oxide coating having a thickness of about 0.01 to about 0.5 µm may be formed in the step (c). It is not necessary to form the oxide coating having the thickness formed in the step (a).

Step (d):

The second oxide coating 34 is partially removed after the step (c). The micropores 31 formed in the step (c) are subjected to pore diameter enlarging processing for enlarging the diameters thereof, to enlarge the diameters of the micropores 35 relative to the diameters of the micropores formed in the step (c). Specific examples of the method of the pore diameter enlarging processing include a method for dipping the aluminum substrate in a solution dissolving alumina, to enlarge the diameters of the micropores formed in the step (c) by etching. Examples of the solution include an aqueous phosphoric acid solution of about 5.0% by mass. The longer the time of the step (d) is, the greater the diameters of the micropores are.

Step (e):

The step (c) is re-performed, to form the shapes of the micropores 35 having two-stage cylindrical shapes having different diameters. Then, the step (d) is re-performed. Thus, as shown in FIG. 2(f), the micropores 35 having taper shapes having a diameter gradually reduced in a depth direction from an opening part can be formed by repeating the steps (c) and (d). As a result, a stamper 20 is obtained, in which anodized alumina having a nano uneven structure having a plurality of periodic micropores formed thereon is formed on the surface to be processed.

When the repetition number of the steps (c) and (d) is increased, a smooth taper shape can be formed. The steps (c) and (d) are preferably performed at least 3 times in total. The conditions of the steps (c) and (d), for example, a time for the pore diameter enlarging processing, and a temperature and a concentration of a solution used for the pore diameter enlarging Processing are appropriately set, and thereby the micropores having various shapes can be formed. For example, the processing time of the step (d) is shortened, or conditions such as a temperature, a concentration, and a time and the like of etching are changed. Thereby, a stamper having a deep part having a suitable diameter enlarging ratio can be formed. The nano uneven structure having a sharp tip can be formed by the stamper.

Thus, as the stamper capable of molding the laminate having a sharp tip part, the diameter of the tip part of the micropore 35 formed in the final step is preferably 1.1 to 1.9 times the diameter of the micropore 35 formed in the first step (c), more preferably 1.1 to 1.8 times, and still more preferably 1.1 to 1.7 times. When the ratio of the diameters of micropore is in the above-mentioned range, the shape of the reversal nano uneven structure of the stamper can be faithfully transferred.

The micropores having a taper shape having a gradually reduced diameter in the depth direction from the opening part are periodically formed on the surface to be processed of the aluminum substrate rendered into a mirror surface by the method for manufacturing the stamper through the above-mentioned steps (a) to (e). As a result, a stamper can be obtained, which has a surface on which the anodized alumina having the reversal structure of the nano uneven structure is formed.

A pretreatment for removing the oxide coating of the surface to be processed of the aluminum substrate may be performed before the step (a). Examples of the method for removing the oxide coating include a method for dipping the aluminum substrate in a chromic acid and phosphoric acid mixed solution.

The anodized porous alumina thus obtained is suitable as the stamper transferring the nano uneven structure to the resin composition in order to manufacture the molded product of the present invention.

The shape of the stamper is not particularly limited. The stamper may have a flat plate shape or a roll shape. The surface on which the reversal structure of the nano uneven structure of the stamper is formed may be subjected to mold release processing so as to facilitate mold releasing. Examples of the method of mold release processing include a method for coating a silicone-based polymer and a fluoropolymer, a method for vapor-depositing a fluorine compound, and a method for coating a fluorine-based or fluorine silicone-based silane coupling agent.

The reversal structure of the nano uneven structure of the stamper is transferred to the surface of the molded product manufactured using the above-mentioned stamper in the relation between a key and a keyhole.

The surface of the stamper can be subjected to mold release processing in order to facilitate the peeling of the stamper from the laminate molded using the stamper. Examples of the mold release processing include a method for coating a silicone-based polymer and a fluoropolymer, a method for vapor-depositing a fluorine compound, and a method for coating a fluorine-based or fluorine silicone-based silane coupling agent.

EXAMPLES

Hereinafter, the present invention will be specifically described with reference to Examples. The present invention is not limited thereto. In the following description, the term "parts" means "parts by mass" unless otherwise specified. Various measurements and valuation methods are as follows.

(1) Measurement of Micropores of Stamper:

Platinum was vapor-deposited on a part of a vertical cross-section of a stamper made of anodized porous alumina for 1 minute. The vertical cross-section was observed using a field emission-type scanning electron microscope (manufactured by JEOL Ltd., trade name: JSM-7400F) at an accelerating voltage of 3.00 kV, whereby intervals (periods) between the adjacent micropores and the depth of the micropores were measured. Specifically, each of the measurements was performed for 10 spots, and the average value thereof was determined as a measured value.

(2) Measurement of Unevenness of Nano Uneven Structure:

Platinum was vapor-deposited on a vertical cross-section of a nano uneven structure for 10 minutes. Intervals between the adjacent projecting parts or recessed parts and the height of the projecting parts were measured by the same apparatus as that of the item (1) in the same condition as that of the item (1). Specifically, each of the measurements was performed for 10 spots, and the average value thereof was determined as a measured value.

(3) Viscosity Measurement of Resin Composition:

The viscosity of a resin composition at 25° C. was measured by a rotary E-type viscosity meter.

(4) Viscoelasticity Measurement of Intermediate Layer:

An intermediate layer raw material was photocured to mold a film having a thickness of 500 µm. The film was punched in a 5 mm wide strip to produce a specimen. The specimen was measured under conditions of a tensile mode, a distance between chucks: 2 cm, and a temperature rise speed at −50 to 100° C. at a vibration frequency of 1 Hz: 2° C./min using a dynamic mechanical spectrometer DMS110 manufactured by Seiko Instruments Inc., to obtain tan δ.

(5) Compression Characteristic of Intermediate Layer:

An intermediate layer raw material was photocured to mold a plate having a thickness of 5 mm. The plate was punched in a cylindrical shape having a diameter of 12 mm to produce a specimen. The specimen was compressed until a compression ratio was set to 50% at a speed of 0.5 mm/min by a compression testing machine, to obtain a stress-strain curve. The compressive stress at the compression ratio of 20% and the stress after being compressed to 50% were released, and a time until the specimen returns to 90% of the original thickness was also measured.

(6) Measurement of Thickness of Each Layer:

Thicknesses of a substrate, the substrate having an intermediate layer formed thereon, and the substrate having the intermediate layer and a surface layer formed thereon were measured, to calculate the thicknesses of each layer.

(7) Pencil Hardness Test:

The test was performed with a 750 g load according to JIS K5600-5-4. The appearance was visually observed at a point of time at which 5 minutes has elapsed after the test, and the hardness of a pencil which causes no damage was described (When no damage is caused by 2H and damage is caused by 3H, the hardness is expressed as "2H".)

(8) Evaluation of Scratch Resistance:

A canvas cloth of 1 cm square was attached to an abrasion testing machine (manufactured by Shinto Scientific Co., Ltd., trade name: HEIDON). The surface of the nano uneven structure was scratched 1000 times under conditions of a reciprocating distance of 50 mm and a head speed of 60 mm/s with a 100 g load applied to the canvas cloth. Then, the appearance was visually observed, and was evaluated according to the following standards.

"Very Good": Flaw cannot be confirmed in a view from any angle.

"Good": Flaw is confirmed depending on angles of view.

"Average": One to two flaws are confirmed in a view from any angle.

"Poor": Flaws of three or greater are confirmed.

[Production of Stamper]

An aluminum plate (purity of 99.99%) was subjected to fabric polishing and electrolytic polishing in a mixed solution of perchloric acid/ethanol (volume ratio: 1/4) to render the surface into a mirror surface.

(a) Step:

The aluminum plate was anodized for 30 minutes in a 0.3 M aqueous oxalic acid solution under conditions of a direct current of 40 V and a temperature of 16° C.

(b) Step:

The aluminum plate on which the oxide coating had been formed in the above-mentioned step was dipped in an aqueous mixed solution including 6% by mass of phosphoric acid/1.8% by mass of chromic acid for 6 hours, thereby removing the oxide coating.

(c) Step:

The aluminum plate was oxidized for 30 seconds in a 0.3 M aqueous oxalic acid solution under conditions of a direct current of 40 V and a temperature of 16° C.

(d) Step:

The aluminum plate on which the oxide coating had been formed in the above-mentioned step was dipped in an aqueous phosphoric acid solution of 5% by mass at 32° C. for 8 minutes, thereby enlarging the micropore diameter.

(e) Step:

The above-mentioned (c) and (d) steps were repeated 5 times in total, thereby obtaining anodized porous alumina having micropores of an approximately conical shape with a period of 100 nm and a depth of 180 nm.

The obtained anodized porous alumina was washed in deionized water, and moisture on the surface thereof was then removed by air blow. The anodized porous alumina was dipped for 10 minutes in a solution obtained by diluting a fluorine-based remover (manufactured by Daikin Industries, Ltd., trade name: OPTOOL DSX) with a diluent (manufactured by HARVES Co., Ltd., trade name HD-ZV) so that the solid content of the fluorine-based remover was set to 0.1% by mass, and was air-dried for 20 hours, to obtain a stamper having micropores formed on the surface.

[Intermediate Layer Raw Materials A]

Components were mixed in blended amounts (parts) shown in Table 1 to obtain intermediate layer raw materials A1 to A11. Abbreviations in Table 1 are as follows.

"EB8402": bifunctional urethane acrylate (manufactured by DAICEL-CYTEC Company, Ltd., trade name: EBECRYL 8402)

"EB8465": bifunctional urethane acrylate (manufactured by DAICEL-CYTEC Company, Ltd., trade name: EBECRYL 8465)

"EB8701": bifunctional urethane acrylate (manufactured by DAICEL-CYTEC Company, Ltd., trade name: EBECRYL 8701)

"A-600": polyethylene glycol diacrylate (manufactured by Shin-Nakamura Chemical Co., Ltd., trade name: NK Ester A-600)

"M1200": bifunctional urethane acrylate (manufactured by Toagosei Co., Ltd., trade name: Aronix M1200)

"ATM-4E": ethoxylated pentaerythritol tetraacrylate (manufactured by Shin-Nakamura Chemical Co., Ltd., trade name: NK Ester ATM-4E)

"CHDMMA": cyclohexanedimethanol monoacrylate (manufactured by Nippon Kasei Chemical Co., Ltd.)

"AE400": polyethylene glycol (n=9) monoacrylate (manufactured by NOF Corp., trade name: BLEMMER AE400)

"AP400": polypropylene glycol (n=7) monoacrylate (manufactured by NOF Corp., trade name: BLEMMER AP400)

"AM230": end methylized polyethylene glycol (n=23) monoacrylate (manufactured by Shin-Nakamura Chemical Co., Ltd., trade name: NK Ester AM230G)

"TPO": 2,4,6-trimethylbenzoyl-diphenyl-phosphine oxide (manufactured by Nihon Ciba-Geigy K.K., trade name: Darocure TPO)

"MEK": methyl ethyl ketone

TABLE 1

| | Polymerization reactive component | | | | | | | | | |
|---|---|---|---|---|---|---|---|---|---|---|
| | Multifunctional monomer | | | | | | Monofunctional monomer | | | |
| | EB8402 | EB8465 | EB8701 | A-600 | M1200 | ATM-4E | CHDMMA | AE400 | AP400 | AM230 |
| Intermediate layer raw material A1 | 70 | | | | | | 20 | 10 | | |
| Intermediate layer raw material A2 | 70 | | | | | | 20 | | 10 | |
| Intermediate layer raw material A3 | 20 | | | | | | 80 | | | |
| Intermediate layer raw material A4 | 50 | | | | | | 50 | | | |
| Intermediate layer raw material A5 | 80 | | | | | | 20 | | | |
| Intermediate layer raw material A6 | | 30 | | | | | 70 | | | |
| Intermediate layer raw material A7 | | | 30 | | | | 70 | | | |
| Intermediate layer raw material A8 | | | | 30 | | | 60 | | 10 | |
| Intermediate layer raw material A9 | 70 | | | | | 20 | | | 10 | |
| Intermediate layer raw material A10 | 20 | | | | | | 50 | | | 30 |
| Intermediate layer raw material A11 | | | | | 30 | 70 | | | | |

TABLE 1-continued

|  | Polymerization initiator TPO | Solvent MEK | Viscosity (mPa·s) | tanδ | 20% compressive stress (MPa) | Restoration time from 50% compression |
|---|---|---|---|---|---|---|
| Intermediate layer raw material A1 | 0.5 |  | 2165 | 0.9 | 3.8 | within 1 minute |
| Intermediate layer raw material A2 | 0.5 | 25 | 87.1 | 0.9 | 2.8 | within 1 minute |
| Intermediate layer raw material A3 | 0.5 |  | 258 | 0.68 | 5.7 | within 5 minutes |
| Intermediate layer raw material A4 | 0.5 |  | 853 | 0.38 | 4.1 | within 3 minutes |
| Intermediate layer raw material A5 | 0.5 |  | 3340 | 0.25 | 6.5 | within 1 minute |
| Intermediate layer raw material A6 | 0.5 |  | 468 | 0.61 | 1.9 | within 1 minute |
| Intermediate layer raw material A7 | 0.5 |  | 94 | 0.33 | 1.3 | Compression failure |
| Intermediate layer raw material A8 | 0.5 | 25 | 41.6 | 0.4 | 2.4 | within 1 minute |
| Intermediate layer raw material A9 | 0.5 | 25 | 41.3 | 0.28 | 10.1 | within 1 minute |
| Intermediate layer raw material A10 | 0.5 |  | 237 | 0.07 | 0.7 | Compression failure |
| Intermediate layer raw material A11 | 0.5 |  | 880 | 0.05 | 73 | Compression failure |

(Preparation of Resin Composition for Forming Surface Layer)

80 parts of ethoxylated pentaerythritol tetraacrylate (manufactured by Shin-Nakamura Chemical Co., Ltd., trade name: NK Ester ATM-4E), 15 parts of silicone diacrylate (manufactured by Shin-Etsu Chemical Co., Ltd., trade name: x-22-1602), 5 parts of 2-hydroxyethyl acrylate, 0.5 parts of 2-hydroxy-2-methyl-1-phenylpropan-1-one (manufactured by Nihon Ciba-Geigy KK., trade name: DAROCURE 1173) and 0.5 parts of 2,4,6-trimethylbenzoyl-diphenyl-phosphine oxide (manufactured by Nihon Ciba-Geigy K.K., trade name: DAROCURE TPO) as an active energy beam polymerization initiators were mixed, thereby obtaining an active energy beam-curable resin composition for forming a surface layer.

Example A1

Formation of Intermediate Layer

A polyethylene terephthalate film (manufactured by Toyobo Co., Ltd., trade name: A-4300, and thickness: 188 μm) was provided as a transparent substrate. An intermediate layer raw material A1 was uniformly applied on the substrate film using a bar coater, and was left at rest in a drier at 80° C. for 5 minutes. Subsequently, ultraviolet ray was irradiated with energy of 800 mJ/cm$^2$ using a high pressure mercury lamp from the application side of the intermediate layer raw material, to cure a coating, thereby forming an intermediate layer. The thickness of the intermediate layer was 18 μm.

(Formation of Surface Layer Having Nano Uneven Structure)

A resin composition for forming a surface layer was cast onto a micropore surface of a stamper, and was covered with the substrate film while the substrate film was broadened so that the intermediate layer was brought into contact with the resin composition. Ultraviolet ray was irradiated with energy of 2000 mJ/cm$^2$ using a high pressure mercury lamp from the substrate film side, to cure the resin composition. The stamper was then peeled off, to obtain a laminate having a nano uneven structure on the surface.

The nano uneven structure of the stamper was transferred to the surface of the laminate. As shown in FIG. 1(a), a nano uneven structure having an approximately conical shape was formed, in which intervals w1 between adjacent projecting parts 13 were 100 nm and height d1 of the projecting parts 13 was 180 nm. Performances of the nano uneven structure body were evaluated. The results are shown in Table 2.

Examples A2 to A11 and A15 to A17, Comparative Examples A1 to A10, Reference Examples A1 and A2

Laminates were produced, which had a nano uneven structure having the same size as that of Example A1 on the surface except that intermediate layer raw materials and layer thicknesses shown in Table 2 were employed. The evaluation results are shown in Table 2.

TABLE 2

|  | Intermediate layer raw material | Film thickness of intermediate layer (μm) | Film thickness of surface layer (μm) | Film thickness ratio | Pencil hardness | Scratch test |
|---|---|---|---|---|---|---|
| Example A1 | Intermediate layer raw material 1 | 18 | 20 | 1.11 | 3H | very good |
| Example A2 | Intermediate layer raw material 2 | 18 | 20 | 1.11 | 3H | very good |
| Example A3 | Intermediate layer raw material 3 | 12 | 14 | 1.17 | 3H | very good |
| Example A4 | Intermediate layer raw material 4 | 20 | 16 | 0.80 | 3H | very good |

TABLE 2-continued

|  | Intermediate layer raw material | Film thickness of intermediate layer (μm) | Film thickness of surface layer (μm) | Film thickness ratio | Pencil hardness | Scratch test |
|---|---|---|---|---|---|---|
| Example A5 | Intermediate layer raw material 5 | 8 | 12 | 1.50 | 3H | good |
| Example A6 | Intermediate layer raw material 6 | 16 | 18 | 1.13 | 3H | very good |
| Example A7 | Intermediate layer raw material 7 | 16 | 16 | 1.00 | 3H | very good |
| Example A8 | Intermediate layer raw material 8 | 18 | 16 | 0.89 | 3H | very good |
| Example A9 | Intermediate layer raw material 9 | 25 | 10 | 0.40 | 3H | very good |
| Example A10 | Intermediate layer raw material 9 | 28 | 14 | 0.50 | 3H | very good |
| Example A11 | Intermediate layer raw material 9 | 30 | 18 | 0.60 | 3H | very good |
| Example A15 | Intermediate layer raw material 2 | 13 | 8 | 0.62 | 3H | very good |
| Example A16 | Intermediate layer raw material 3 | 15 | 19 | 1.27 | 3H | very good |
| Example A17 | Intermediate layer raw material 3 | 18 | 25 | 1.39 | 3H | very good |
| Comparative Example A1 | Intermediate layer raw material 1 | 5 | 20 | 4.00 | poor | good |
| Comparative Example A2 | Intermediate layer raw material 1 | 20 | 5 | 0.25 | poor | very good |
| Comparative Example A3 | Intermediate layer raw material 9 | 12 | 3 | 0.25 | peeling | good |
| Comparative Example A4 | Intermediate layer raw material 9 | 23 | 7 | 0.30 | poor | very good |
| Comparative Example A5 | Intermediate layer raw material 9 | 30 | 10 | 0.33 | poor | very good |
| Comparative Example A6 | Intermediate layer raw material 9 | 10 | 16 | 1.60 | poor | good |
| Comparative Example A7 | Intermediate layer raw material 10 | 16 | 14 | 0.88 | peeling | poor |
| Comparative Example A8 | Intermediate layer raw material 11 | 15 | 10 | 0.67 | poor | poor |
| Comparative Example A9 | Intermediate layer raw material 3 | 18 | 6 | 0.33 | peeling | very good |
| Comparative Example A10 | Intermediate layer raw material 3 | 15 | 26 | 1.73 | poor | very good |
| Reference Example 1 | Intermediate layer raw material 9 | 30 | 22 | 0.73 | poor | very good |
| Reference Example 2 | Intermediate layer raw material 9 | 30 | 30 | 1.00 | poor | very good |

As is obvious from the results of Table 2, the laminates of Examples A1 to A6 and A15 to A17 had no flaw left in the pencil hardness test, and had high scratch resistance in the reciprocating scratch test.

The laminate of Comparative Example A1 had the thin intermediate layer. As a result, a stress could not be dispersed in the pencil hardness test, and the laminate was damaged by pencil hardness H. The laminate of comparative Example A2 had the thin surface layer with respect to the intermediate layer. As a result, the surface layer could not follow the deformation of the intermediate layer in the pencil hardness test. The breaking of the surface layer was generated. The laminate was damaged by pencil hardness 2H.

The laminate of Comparative Example A3 had the excessive thin surface layer. As a result, the peeling of the surface layer was generated in the pencil hardness test 2H. The laminates of Comparative Examples A4, A5, and A9 had the thin surface layer with respect to the intermediate layer. As a result, the surface layer could not follow the deformation of the intermediate layer in the pencil hardness test. The breaking of the surface layer was generated. The laminates were damaged by pencil hardness 2H.

The laminates of Comparative Examples A6 and A10 had the surface layer thicker than the intermediate layer. As a result, a stress could not be dispersed in the pencil hardness test, and the laminates were damaged by pencil hardness H. The laminates of Comparative Examples A7 and A8 had the intermediate layer having small tan δ and had unsuitable compression characteristic. As a result, energy could not be reduced in the reciprocating scratch test, and the laminates were visibly damaged. The peeling of the surface layer was generated by pencil hardness H, or the surface layer was damaged.

The laminates of Reference Examples A1 and A2 had the excessive thick surface layer. As a result, a stress could not be dispersed in the pencil hardness test, and the laminates were damaged by pencil hardness H.

Examples A12 to A14 and Reference Examples A3 and A4

As shown in Table 3, intermediate layer raw materials having the same compositions as that of Example A2 (intermediate layer raw material 2) were prepared except that an antistatic agent (LFBS, fluoroalkyl sulfonate (manufactured by Mitsubishi Materials Electronic Chemicals Co., Ltd.: Ftop LFBS)) in a predetermined amount was added. The main component compositions of these intermediate layer raw materials are the same as that of Example A2. Therefore, the intermediate layer raw materials have almost the same viscosity, tan δ, 20% compressive stress, and restoration time from 50% compression as those of Example A2 (intermediate layer raw material 2).

Laminates having a nano uneven structure having the same size as that of Example A1 on the surface were produced except that the above-mentioned intermediate layer raw materials were used and the film thicknesses of the intermediate layer and the surface layer shown in Table 3 were employed. The surface resistance values of these laminates were measured at a voltage of 100V using an insulation resistance meter SM-10E manufactured by DKK-TOA Corp. The results are shown in Table 3.

"EB8465": bifunctional urethane acrylate (manufactured by DAICEL-CYTEC Company, Ltd., trade name: EBECRYL 8465)

"EB8701": trifunctional urethane acrylate (manufactured by DAICEL-CYTEC Company, Ltd.)

"A-600": bifunctional polyethylene glycol diacrylate (manufactured by Shin-Nakamura Chemical Co., Ltd., trade name: NK Ester A-600)

"M1200": bifunctional urethane acrylate (manufactured by Toagosei Co., Ltd., trade name: Aronix M1200)

"ATM-4E": ethoxylated pentaerythritol tetraacrylate (manufactured by Shin-Nakamura Chemical Co., Ltd., trade name: NK Ester ATM-4E)

TABLE 3

| | Polymerization reactive component | | | Polymerization initiator | Antistatic agent | Solvent | Film thickness of intermediate layer (μm) | Film thickness of surface layer ((μm) | Surface resistance value (Ω) | Pencil hardness | Scratch test |
|---|---|---|---|---|---|---|---|---|---|---|---|
| | EB8402 | CHDMMA | AP400 | TPO | LFBS | MEK | | | | | |
| Example A12 | 70 | 20 | 10 | 0.5 | 1 | 25 | 18 | 20 | $1.2 \times 10^{13}$ | 3H | very good |
| Example A13 | 70 | 20 | 10 | 0.5 | 2 | 25 | 18 | 20 | $3.3 \times 10^{12}$ | 3H | very good |
| Example A14 | 70 | 20 | 10 | 0.5 | 10 | 25 | 18 | 20 | $2.4 \times 10^{11}$ | 3H | very good |
| Reference Example A3 | 70 | 20 | 10 | 0.5 | — | 25 | 18 | 20 | $1.0 \times 10^{17}$ or greater | 3H | very good |
| Reference Example A4 | 70 | 20 | 10 | 0.5 | 2 | 25 | 18 | 60 | $5.4 \times 10^{13}$ | poor | good |

As shown in Table 3, because Examples A12 to A14 used the antistatic agent, Examples A12 to A14 had a reduced surface resistance value and good antistatic performance. Because Reference Example 3 did not use the antistatic agent, Reference Example 3 had a high surface resistance value. Reference Example 4 had the excessive thick surface layer, and the antistatic performance of the intermediate layer was not reflected.

[Intermediate Layer Raw Materials B]

Components were mixed in blended amounts (parts) shown in Table 1, to obtain intermediate layer raw materials B1 to B13.

Abbreviations in Table 4 are as follows.

"EB8402": bifunctional urethane acrylate (manufactured by DAICEL-CYTEC Company, Ltd., trade name: EBECRYL 8402)

"TMPT-9EO": ethoxylated trimethylolpropanetrimethacrylate (manufactured by Shin-Nakamura Chemical Co., Ltd., trade name: NK Ester TMPT-9EO)

"CHDMMA": cyclohexanedimethanol monoacrylate (manufactured by Nippon Kasei Chemical Co., Ltd.)

"AP400": polypropylene glycol (n=7) monoacrylate (manufactured by NOF Corp., trade name: BLEMMER AP400)

"AM230": end methylized polyethylene glycol (n=23) monoacrylate (manufactured by Shin-Nakamura Chemical Co., Ltd., trade name: NK Ester AM230G)

"Irg":1.2α-hydroxyalkylphenone (manufactured by Nihon Ciba-Geigy K.K., trade name: Irgacure 184)

"MEK": methyl ethyl ketone

TABLE 4

| Intermediate layer raw materials | Polymerization reactive component (parts by mass) | | | | | | | | | | Polymerization initiator (parts by mass) | Solvent (parts by mass) |
|---|---|---|---|---|---|---|---|---|---|---|---|---|
| | Multifunctional monomer | | | | | | | Monofunctional monomer | | | | |
| | EB8402 | EB8465 | EB8701 | A-600 | M1200 | ATM-4E | TMPT-9EC | CHDMMA | AP400 | AM230 | Irg | MEK |
| B1 | 70 | | | | | | | 20 | 10 | | 3 | 30 |
| B2 | 80 | | | | | 10 | | | 10 | | 3 | 30 |
| B3 | 40 | | | | | 30 | | | 30 | | 3 | 30 |
| B4 | 80 | | | | | | | 20 | | | 3 | 30 |
| B5 | | | 30 | | | | | 70 | | | 3 | 30 |
| B6 | 20 | | | | | | | 50 | | 30 | 3 | 30 |
| B7 | 20 | | | | | | | 80 | | | 3 | 30 |
| B8 | 50 | | | | | | | 50 | | | 3 | 30 |
| B9 | | | 30 | | | | | 60 | 10 | | 3 | 30 |
| B10 | | 30 | | | | | | 70 | | | 3 | 30 |
| B11 | 70 | | | | | 20 | | | 10 | | 3 | 30 |

TABLE 4-continued

| | Polymerization reactive component (parts by mass) | | | | | | | | | | Polymerization initiator (parts by mass) | Solvent (parts by mass) |
| | Multifunctional monomer | | | | | | | Monofunctional monomer | | | | |
| Intermediate layer raw materials | EB8402 | EB8465 | EB8701 | A-600 | M1200 | ATM-4E | TMPT-9EC | CHDMMA | AP400 | AM230 | Irg | MEK |
|---|---|---|---|---|---|---|---|---|---|---|---|---|
| B12 | 80 | | | | | 10 | | | 10 | | 3 | 30 |
| B13 | | | | | 30 | 70 | | | | | 3 | 30 |

Example B1

The following materials were mixed to prepare a raw material for an active energy beam-curable surface layer.
ethoxylated pentaerythritol tetraacrylate (manufactured by Shin-Nakamura Chemical Co., Ltd., trade name: NK Ester ATM-4E): 80 parts
silicone diacrylate (manufactured by Shin-Etsu Chemical Co., Ltd., trade name: x-22-1602): 15 parts
2-hydroxyethyl acrylate: 5 parts
active energy beam polymerization initiator
 2-hydroxy-2-methyl-1-phenylpropan-1-one (manufactured by Nihon Ciba-Geigy K.K., trade name: DAROCURE 1173): 0.5 parts
 2,4,6-trimethylbenzoyl-diphenyl-phosphine oxide (manufactured by Nihon Ciba-Geigy K.K., trade name: DAROCURE TPO): 0.5 parts
A polyethylene terephthalate film (manufactured by Toyobo Co., Ltd., trade name: A-4300, and thickness: 188 µm) was provided as a transparent substrate. An intermediate layer raw material 1 was uniformly applied on the substrate film using a bar coater, and was left at rest in a drier at 80° C. for 5 minutes. Subsequently, ultraviolet ray was irradiated with energy of 800 mJ/cm² using a high pressure mercury lamp from the application side of the intermediate layer raw material, to cure a coating, thereby forming an intermediate layer.

A resin composition for forming a surface layer was cast onto a micropore surface of a stamper, and was covered with the substrate film while the substrate film was broadened so that the intermediate layer was brought into contact with the resin composition. Ultraviolet ray was irradiated with energy of 2000 mJ/cm² using a high pressure mercury lamp from the substrate film side, to cure a surface layer raw material. The stamper was then peeled off, to obtain a laminate having a nano uneven structure on the surface.

The nano uneven structure of the stamper was transferred to the surface of the laminate. As shown in FIG. 1(a), a nano uneven structure of an approximately conical shape was formed, in which intervals w1 of adjacent projecting parts 13 were 100 nm and height d1 of the projecting parts 13 was 180 nm. Scratch resistance and pencil hardness of the laminate were evaluated as follows. The results are shown in Table 5.

[Scratch Resistance]

The test was performed by the same method as in the evaluation of the scratch resistance of the above item (8) except that the laminate was scratched 3500 times, to evaluate the laminate according to the following standards.
"Very Good": Flaws cannot be confirmed.
"Good": Flaws are confirmed depending on angles of view or only when the laminate is placed on a black cloth and the like.
"Poor": Flaws are confirmed.

[Pencil Hardness]

The test was performed by the same method as in the pencil hardness test of the above item (7), to evaluate the laminate according to the following standards.
"Very Good": 4H or greater
"Good": greater than 2H and less than 4H
"Poor": 2H or less

Examples B2 to B5, Comparative Examples B1 to B8

Laminates were produced in the same manner as in Example B1 except that the intermediate layer raw material shown in Table 4 was employed. The evaluation results are shown in Table 5.

TABLE 5

| | Intermediate layer raw materials | Ratio of storage moduli of surface layer and intermediate layer | | Scratch resistance | Pencil hardness |
| | | MG/SG | mg/sg | | |
|---|---|---|---|---|---|
| Example B1 | B1 | 0.0796 | 0.0231 | very good | good |
| Example B2 | B2 | 0.0818 | 0.0351 | good | very good |
| Example B3 | B3 | 0.0134 | 0.0395 | very good | very good |
| Example B4 | B4 | 0.1319 | 0.0047 | good | poor |
| Example B5 | B5 | 0.0036 | 0.0082 | good | poor |
| Comparative Example B1 | B6 | 0.0015 | 0.0042 | poor | poor |
| Comparative Example B2 | B7 | 0.4772 | 0.0296 | poor | very good |
| Comparative Example B3 | B8 | 0.4686 | 0.0153 | poor | good |
| Comparative Example B4 | B9 | 0.3506 | 0.0193 | poor | good |
| Comparative Example B5 | B10 | 0.2416 | 0.0102 | poor | good |
| Comparative Example B6 | B11 | 0.3302 | 0.0717 | poor | poor |
| Comparative Example B7 | B12 | 0.2552 | 0.0522 | poor | poor |
| Comparative Example B8 | B13 | 1.3293 | 0.5919 | poor | poor |

The laminates of Examples B1 to B5 had good appearance after the reciprocating scratch test, and had excellent scratch resistance. The laminates of Examples B1 to B3 exhibited "3H" or greater in the pencil test.

Because the laminate of Comparative Example B1 had a low ratio of the storage modulus of the intermediate layer to that of the surface layer, and had insufficient strength, the surface layer was scratched off with the intermediate layer in the pencil test, and breaking and peeling were generated on the surface layer. Although all the laminates of Comparative Examples B2 to B5 exhibited "3H" or greater in the pencil test, the laminates had a high ratio of the storage modulus of the intermediate layer to that of the surface layer at 1 Hz and 20° C., and the projection became brittle to be easily broken. The laminates were clearly damaged in the reciprocating scratch test. The laminates of Comparative Examples B6 to B8 had a high ratio of the storage modulus of the intermediate layer to that of the surface layer at 1 Hz and 20° C., and the projection became brittle to be easily abraded. The laminates were damaged in the reciprocating scratch test. The laminates had a high ratio of the minimum value of the storage modulus of the intermediate layer to that of the storage modulus of the surface layer in the rubber-like flat part, and the laminates were damaged by the breaking of the projection in the pencil test.

INDUSTRIAL APPLICABILITY

The laminate of the present invention has excellent scratch resistance, has a surface nano uneven structure which is hard to receive damages. The laminate can be used for building material applications such as a surface wall and a roof, a window material and a mirror for a house, an automobile, a train, and a ship and the like, a display capable of being touched with person's hand, and the like, and is industrially very useful.

REFERENCE SIGNS LIST

10: laminate
11: transparent substrate
12: surface layer
13, 13b: projecting part
13a: top of projecting part
14: recessed part
14a: bottom point of recessed part
15: intermediate layer
W1: intervals between adjacent projecting parts
d1: perpendicular distance between bottom point of recessed part and top of projecting part
20: stamper
30: surface to be processed
31: micropore
32: first oxide coating
33: micropore generation point
34: second oxide coating

The invention claimed is:

1. A laminate comprising:
   a substrate; and
   a surface layer laminated on the substrate with an intermediate layer sandwiched therebetween,
wherein:
   the intermediate layer has a thickness of 8 to 40 µm;
   the surface layer has a thickness 0.4 to 1.5 times that of the intermediate layer;
   the surface layer has a nano uneven structure;
   intervals between adjacent projecting parts or recessed parts of the nano uneven structure are 400 nm or less;
   materials of the intermediate layer and the surface layer are different from each other; and
   the laminate satisfies the following (A) and/or (B):
   (A) tan δ (loss tangent) of the intermediate layer as measured under a condition of a vibration frequency of 1 Hz. at 20° C. is 0.2 or greater; and
   (B) a ratio (MG/SG) of a storage modulus (MG) of the intermediate layer to a storage modulus (SG) of the surface layer as measured under a condition of a vibration frequency of 1 Hz. at 20° C. is 0.003 or greater and 0.14 or less.

2. The laminate according to claim 1, wherein the intermediate layer comprises a resin having a compressive breaking stress of 20 MPa or greater and a compressive stress of 1 to 20 MPa in a compression ratio of 20%, and returning to 90% or greater of the original thickness when a stress is released after the resin is compressed.

3. The laminate according to claim 1, wherein a ratio (mg/sg) of a minimum value (mg) of a storage modulus in a rubber-like plateau region of the intermediate layer to a minimum value (sg) of a storage modulus in a rubber-like plateau region of the surface layer as measured under a condition of a vibration frequency of 1 Hz is 0.009 or greater and 0.05 or less, wherein a rubber-like plateau region is a region where a change in a storage modulus is small with respect to a temperature change on a temperature side higher than a glass transition point in viscoelasticity measurement.

4. The laminate according to claim 1, wherein the intermediate layer is formed by irradiating an intermediate layer raw material with an active energy beam to cure the intermediate layer raw material.

5. The laminate according to claim 1, wherein the intermediate layer comprises at least one additive agent selected from the group consisting of an antistatic agent, an ultraviolet absorber, and a near infrared absorber.

6. An antireflection article comprising a laminate according to claim 1.

7. A water-repellent article comprising a laminate according to claim 1.

8. A display comprising a laminate according to claim 1.

9. An automotive member comprising a laminate according to claim 1.

10. A method for manufacturing a laminate according to claim 1, the laminate having a nano uneven structure, the method comprising:
   an intermediate layer forming step of applying an intermediate-layer raw material or a substrate and irradiating the intermediate layer raw material with an active energy beam to completely cure a coating of the intermediate layer raw material or cure the coating up to a state not reaching complete curing; and
   a surface layer forming step of interposing an active energy beam-curable resin composition between a stamper having a reversal structure of the nano uneven structure and the intermediate layer formed on the substrate, irradiating the active energy beam-curable resin composition with an active energy beam to cure the active energy beam-curable resin composition, and peeling off the stamper from a layer comprising a cured product of the active energy beam-curable resin composition to form a surface layer having the nano uneven structure comprising the cured product.

11. The method for manufacturing a laminate according to claim 10, wherein the intermediate layer raw material is irradiated with ultraviolet ray in the presence of oxygen to cure the coating of the intermediate layer raw material up to the state not reaching complete curing in the intermediate layer forming step.

12. The method for manufacturing a laminate according to claim 10, wherein a thickness of the coating is controlled by an air knife when the intermediate layer raw material is applied in the intermediate layer forming step.

13. The method for manufacturing a laminate according to claim 10, wherein the intermediate layer raw material is applied by gravure coating in the intermediate layer forming step.

* * * * *